(12) United States Patent
Nishimura et al.

(10) Patent No.: US 6,223,279 B1
(45) Date of Patent: Apr. 24, 2001

(54) SINGLE CHIP MICROCOMPUTER HAVING A DEDICATED ADDRESS BUS AND DEDICATED DATA BUS FOR TRANSFERRING REGISTER BANK DATA TO AND FROM AN ON-LINE RAM

(75) Inventors: Akira Nishimura, Yokohama; Sunao Ogawa, Kawasaki; Yasuo Yamada, Tokyo; Akira Kanuma, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/482,792

(22) Filed: Jun. 7, 1995

Related U.S. Application Data (63) Continuation of application No. 07/875,808, filed on Apr. 30, 1992, now abandoned.

(30) Foreign Application Priority Data

Apr. 30, 1991 (JP) .................................... 03-098671

(51) Int. Cl.⁷ ...................................................... G06F 15/00
(52) U.S. Cl. ............................. 712/228; 712/33; 710/128
(58) Field of Search ................................... 395/800, 325, 395/275; 712/228, 33; 710/27, 128

(56) References Cited

U.S. PATENT DOCUMENTS

| | | | |
|---|---|---|---|
| 3,781,810 | * 12/1973 | Downing | 395/775 |
| 3,999,163 | * 12/1976 | Leg et al. | 395/325 |
| 4,016,541 | * 4/1977 | Delagi et al. | 395/775 |
| 4,268,903 | * 5/1981 | Miki et al. | 395/425 |
| 4,434,461 | 2/1984 | Puhl | 395/25 |
| 4,733,346 | * 3/1988 | Tanaka | 395/325 |
| 4,912,636 | 3/1990 | Magar et al. | 395/425 |
| 5,021,993 | * 6/1991 | Matoba et al. | 395/775 |

OTHER PUBLICATIONS

Thurber et al. "A systematic approach to design of digital dussing structure" 1972 pp 719–740.*
Patterson. Reduced Instruction Set Computer's; ACM 1985.*
Maejima et al. "A 16–bit Microprocessor with Multi–Register Bank Architecuture" Jun. 1987.*
"Dual Bus Processor" IBM TDB. Sep. 1989.*
"High Performance RISC Processor" IBM TDB Dec. 1989.*

* cited by examiner

*Primary Examiner*—Larry D. Donaghue
(74) *Attorney, Agent, or Firm*—Foley & Lardner (57) ABSTRACT

A single chip microcomputer comprises a central processing unit (CPU) 2, a on-chip RAM 3, a on-chip ROM 5, a first bus DBUS for connecting the CPU, RAM, and ROM with one another and transferring data between them, a second bus ABUS for passing address data corresponding to the data passed through the first bus, a third bus SDBUS for connecting the CPU 2 with the RAM 3 and transferring data between them, the number of bits of the third bus SDBUS being larger than that of the first bus DBUS, and a fourth bus BABUS for connecting the CPU 2 with the RAM 3 and passing address data corresponding to the data passed through the third bus SDBUS. The CPU 2 has a data memory RF serving as general purpose registers for providing internal data to the third bus SDBUS, and a bank specifying register BP for holding positional data of a mapping region in the RAM 3 where the contents of the data memory RF are mapped and providing the positional data to the fourth bus BABUS. The RAM 3 has a memory cell array 31, a bank address control circuit 35 connected to the fourth bus BABUS, for generating a real address according to the contents of the bank specifying register BP (BP0, BP1), and a selection circuit 37 for selecting the real address generated by the bank address control circuit 35, or the address provided through the second bus ABUS.

12 Claims, 10 Drawing Sheets

BNK-BUS : 4-BIT DATA BUS CONNECTED TO BANK RAM

BNKAD (1 : 0) : REGISTER FILE ADDRESS FOR TRANSFERRING DATA TO BANK RAM

BNKTX : INDICATING THAT DATA IS TRANSFERRED FROM REGISTER FILE TO BANK RAM

BNKWR : INDICATING THAT DATA IS WRITTEN FROM BANK RAM TO REGISTER FILE

SINGLE CHIP MICROCOMPUTER HAVING A DEDICATED ADDRESS BUS AND DEDICATED DATA BUS FOR TRANSFERRING REGISTER BANK DATA TO AND FROM AN ON-LINE RAM

This application is a continuation, of application Ser. No. 07/875,808, filed Apr. 30, 1992 now abandoned.

BACKGROUND OF THE INVENTION

1. Field of the Invention

The present invention relates to a single chip microcomputer, and particularly to a high-speed single chip microcomputer which is compact and has a register bank function to form a high-performance system.

2. Description of the Prior Art

General purpose microcomputers (MCUs) and microprocessors (MPUs) used for built-in control devices usually employ a register bank function to process interrupts at high speed or to deal with multitasking and multiprogramming systems.

The MCUs and MPUs usually incorporate a set of general purpose registers (for example, eight 16-bit registers), a program counter, and a processor status word. These registers are selected by a user program and used for holding various data such as operation results and program statuses.

When an interrupt occurs to execute an interrupt processing program, or when a request (task switch) for executing an urgent program arises under a multitask environment, or when a subroutine call occurs for shifting control from a main program to a subroutine program during the execution of a program, the MCUs and MPUs temporarily suspend the presently executing program and start a different program. At this time, data held in the registers must be temporarily saved in another location (usually, an external memory), and data necessary for the different program must be newly read from the outside and set in the registers.

After the different program is completed, the saved data must be restored in the registers to resume the suspended program.

If the MCUs and MPUs have no register bank function, the contents of the registers must be saved in the external memory, or in a RAM in the case of single chip MCUs. Generally, the external memory is accessible only at low speed, so that it takes a very long time for saving and restoring data of the registers to and from the external memory. This is a bottleneck for the built-in control devices that must quickly respond to an interrupt request in real time, and lowers system performance.

To solve the problem and improve system performance, the MCUs and MPUs often employ the register bank function. The register bank function involves several sets of general purpose registers which are built in the processor. Each set comprises, for example, sixteen 16-bit general purpose registers. If the register bank function uses eight register banks, eight sets of general purpose registers, i.e., 128(8×16) 16-bit general purpose registers must be prepared.

These general purpose register sets (register banks) are properly switched from one to another when an interrupt or a task switch occurs, to shorten an interrupt response time or a task switching time and improve system performance. When it is necessary to save and restore the contents of one general purpose register set due to an interrupt or a task switch, the register bank function is very useful to eliminate saving the contents of the general purpose register set into the external memory at slow speed and slowly restoring the data from the external memory. The register bank function internally switches the general purpose register sets from one to another at high speed without using the slow-speed external memory. Thus, the register bank function improves a register bank switching speed and shortens an interrupt and task switch handling time.

Figure 1:
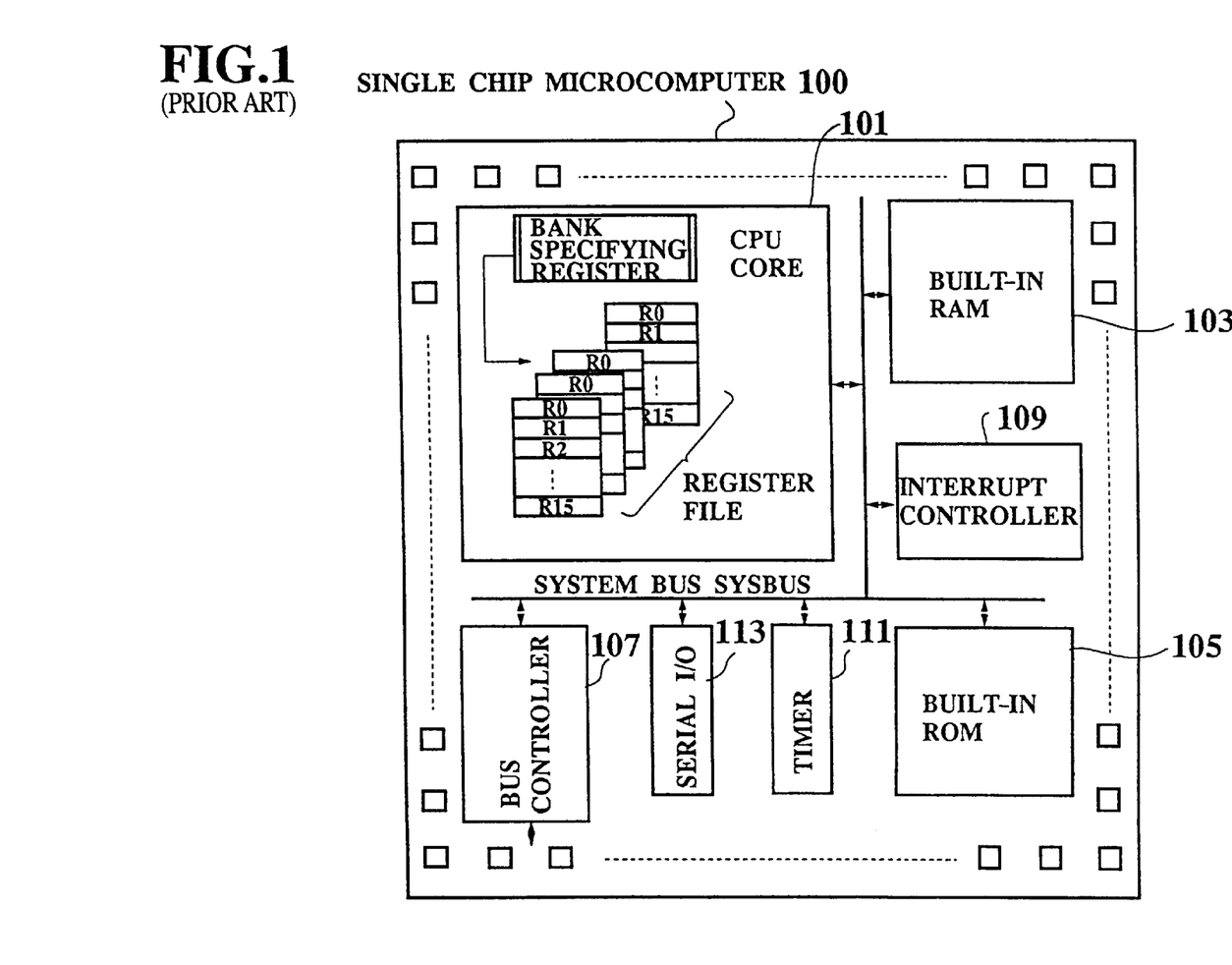
FIG. 1 is a schematic view showing a single chip microcomputer employing a register bank function according to the prior art.
Figure 2:
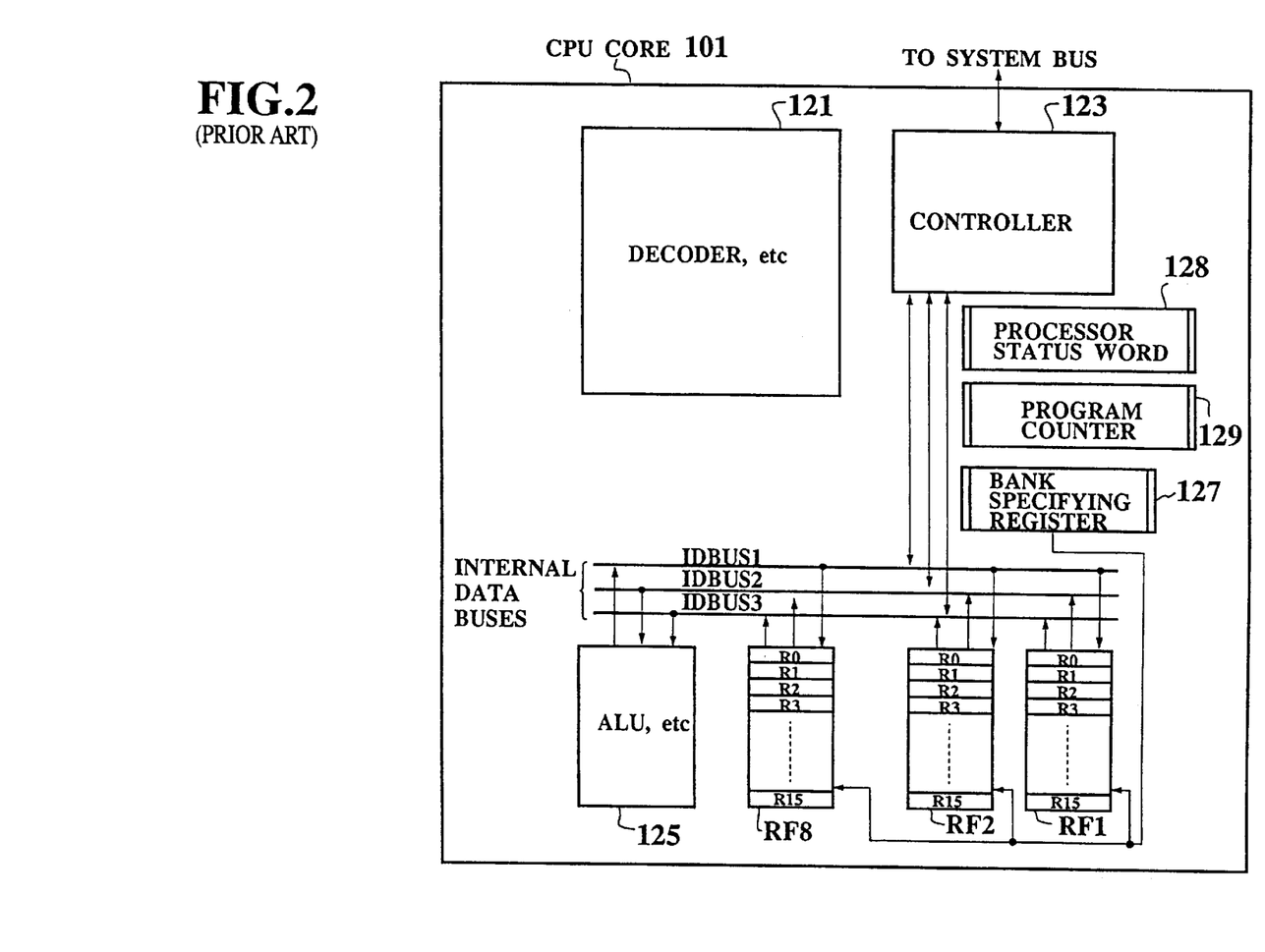
FIG. 2 is a schematic view showing a CPU core mounted on the single chip microcomputer according to the prior art.

FIG. 1 shows a single chip microcomputer employing the conventional register bank function, and FIG. 2 shows a CPU core disposed in the single chip microcomputer.

In FIG. 1, the single chip microcomputer 100 comprises the CPU core 101, a on-chip RAM 103, a on-chip ROM 105, a bus controller 107, an interrupt controller 109, a timer 111, a serial I/O 113, etc. These elements send and receive data through a system bus SYSBUS (including an address bus ABUS and a data bus DBUS) in the chip. Data communication with the outside of the chip is carried out through the bus controller 107 and an I/O pad.

In FIG. 2, the CPU core 101 incorporates a plurality of general purpose register sets RF1 through RF8 forming register banks. These register sets are connected to a plurality of internal data buses IDBUS1 through IDBUS3 in the CPU core 101, so that data are transferred and processed between the register sets RF1 to RF8 and an ALU (arithmetic and logic unit) 125, etc.

It is important for efficiently processing data in the CPU core 101 that the register sets RF1 to RF8 are accessible from a plurality of the data buses IDBUS1 to IDBUS3. Generally, the number of ports of a memory that forms the register sets is at least three, i.e., two for reading and one for writing. When another writing port is added to provide four ports in total, data processing efficiency will be improved. Accordingly, the register sets are usually formed from a RAM having three or four ports.

The CPU core 101 also includes a bank specifying register 127 for specifying one register bank (general purpose register set) to use, a processor status word 128 for storing the statuses of the CPU, and a program counter 129 for storing the address of a program presently executed. The bank specifying register 127 holds the number of the register bank presently used for executing the program, i.e., the register 127 represents which bank is currently used. Switching the register banks from one to another is carried out by rewriting the bank specifying register 127. After the present program is suspended and the bank specifying register 127 is rewritten, the general purpose register set corresponding to the newly specified number starts to be used. From this moment, the previously used register set will not be used. The contents of the previously used register set, however, will be preserved.

When an interrupt occurs, the contents of a general purpose register set are saved as follows:

(1) The contents of the processor status word, program counter, and bank specifying register are saved into an external memory (stack) through the system bus.

(2) The bank specifying register is updated to specify another general purpose register set to be used.

Once the interrupt process is completed, the original program is resumed in the following manner:

(1) The previously saved data of the program counter, pr1ocessor status word, and bank specifying register are restored from the external memory through the system bus.

This method eliminates the need to save and restore the contents of the general purpose register set to and from the external memory through the system bus at slow speed, and instead, enables the general purpose register sets in the CPU to be switched from one to another at high speed.

In these days, requirements for functions of the MCUs and MPUs for built-in control devices are increasing. As a result, the number of register banks is increasing from around 4 to 8 banks to 16, 32, 64, and even 256 banks. As the number of register banks increases, the conventional register bank method has raised the following problems.

In designing a multiport memory, a space or silicon area occupied by a unit memory cell increases in proportion to the number of ports of the memory because the number of transistors and wiring increase in proportion to the number of the ports. Namely, the multiport general purpose register set inevitably needs a large space.

If the number of banks is around four, the silicon area problem is not too severe even if the bank involves large memory cells, because the total number of memory bits needed is not so large (if the size of each general purpose register set is 16 bits×16 registers, 1024 bits in total for four banks). In this case, the multiport memory does not cause serious trouble in terms of the die area.

When the number of the banks increases, the number of bits of each memory cell proportionally increases, and the area of the multiport memory no longer becomes ignorable. In addition, the multiport memory involving a large number of bits is difficult to design, consumes a lot of power, and operates at slow speed. The multiport memory of large size, therefore, is not preferable in LSI designing.

The conventional register bank memories must use multiport memory cells, so that, when the number of register banks is increased, its portion of the chip space greatly increases and large electric power is consumed. In addition, the large-scale multiport memory is difficult to design and its operation speed is slow, thereby limiting chip operation speed. Further, the conventional register bank memory is exclusively used for register banks, so that, when only one register set is used without using the register bank function, the other unused register sets will be wasteful.

When the MCUs and MPUs execute a program written by a high-level language such as C, the register bank function can be used to switch to a subroutine program from a main program. At this time, the main program frequently passes data as arguments over to the subroutine program, or the subroutine program returns operation results to the main program. It is advantageous if part of the data is shared by (transferred between) register banks when one register bank is switched to another due to the subroutine call.

The conventional register banks, however, are formed from different general purpose register sets, i.e., physically different storage elements, so that data are hardly shared by the register banks.

Namely, the single chip microcomputer having the conventional register banks has the following drawbacks:

(1) Increasing the number of the register banks drastically increases chip space and power consumption and limits a chip operation speed.

(2) When the register bank function is not used, unused register sets will be wasteful.

(3) It is difficult to realize a mechanism for transferring data between the register banks.

SUMMARY OF THE INVENTION

To solve the problems, an object of the invention is to provide a single chip microcomputer employing a register bank method. This microcomputer efficiently uses chip space and an on-chip RAM and-easily transfers data between different register banks.

According to a first aspect of the invention, a single chip microcomputer comprises (a) a central processing unit (CPU) for processing programs; (b) an on-chip RAM; (c) an on-chip ROM; (d) a first bus for connecting the CPU, RAM, and ROM with one another and transferring data between them; (e) a second bus for passing address data corresponding to the data passed through the first bus; (f) a third bus for connecting the CPU with the RAM and transferring data between them, the number of bits of the third bus being larger than that of the first bus; and (g) a fourth bus for connecting the CPU with the RAM and passing address data corresponding to the data passed through the third bus.

If there is a request for executing a different program, the CPU of the single chip microcomputer suspends a presently executing program, saves data held in the CPU through the third bus into a region of the RAM specified by an address provided through the fourth bus, starts the different program, completely executes the different program, restores the saved data into the CPU through the third bus from the region of the RAM specified by the address provided through the fourth bus, and resumes the suspended program.

The CPU includes (1) a general purpose register set for holding operation data, (2) a program counter for holding the address of a presently executing program, (3) a processor status word register for holding the statuses of the CPU, and (4) a bank specifying register. When data are saved and restored to and from a register bank defined in the RAM, an address held in the bank specifying register (4) is provided to the fourth bus. At the same time, the general purpose register set (1), the program counter (2) and processor status word register (3) are selectively connected to the third bus.

A value in the bank specifying register to be provided to the fourth bus may be smaller than the total number of bytes of the general purpose register set, so that mapping regions of different register banks secured in the RAM may partly overlap one upon another.

In the single chip microcomputer according to the first aspect of the invention, the bit width of the third bus (SDBUS) is wide, and the fourth bus (BABUS) transfers address data corresponding to data transferred through the third bus SDBUS. These buses SDBUS and BABUS are disposed between the CPU and the RAM, so that data are transferred between the CPU and the RAM at high speed.

The CPU may have one or a small number of data memories (RFs) serving as general purpose register sets for providing internal data to the third bus SDBUS. The CPU also has the program counter (PC) and program status word (PSW). Data processing in the CPU is carried out with use of these registers. Data in the RAM are mapped into the register sets RFs of the CPU through the third bus SDBUS. Data in different locations in the RAM prepare different data in the register sets RFs of the CPU. Since the mapping is carried out at high speed, i.e., since data are transferred between the register sets RFs of the CPU and the RAM at high speed, it seems as if the CPU incorporates a large number of register sets RFs (register banks).

When the register banks are switched from one to another, the contents of the register set RF are saved and restored through the third bus SDBUS, which transfers the data between the RAM and the register set RF at high speed. The CPU may have only one or a small number of the general purpose register sets, program counter, and processor status word, so that the register sets will not occupy large space because the register sets have multiple ports.

In addition to the bank specifying register BP for specifying a register bank number, the CPU incorporates a bank address control circuit. According to data held in the bank specifying register BP, the bank address control circuit produces the address of a mapping area in the on-chip RAM where data to and from the CPU are stored, and provides the address to the fourth bus BABUS. The bank address control circuit also provides an instruction to read or write the general purpose register sets, program counter, and processor status word.

The single chip microcomputer according to the invention may set the start addresses (byte addresses) of mapping regions at intervals each being smaller than the size (total number of bytes) of the register set RF. The invention may properly set start addresses so that mapping regions in the RAM for storing data of different register sets RFs may partly overlap one upon another. This enables the different register banks to share data. When the register banks are switched from one to another, data can be partly passed over from one register bank to another.

This method easily realizes many register banks without increasing chip space. When different register banks are overlapped in the RAM, they can share the same data, to achieve a parameter sharing function used by a subroutine call.

According to a second aspect of the invention, a central processing unit (CPU) for processing programs comprises (a) first input/output means for receiving and providing data and address data corresponding to the data when a present program is suspended to start a different program and when the different program is completed and the suspended program is resumed; and (b) second input/output means for receiving and providing data and address data corresponding to the data in a normal case other than the case handled by the first input/output means.

A third aspect of the invention provides a single chip microcomputer comprising (a) a central processing unit (CPU) for processing programs; (b) a on-chip RAM; (c) a on-chip ROM; (d) a first bus for connecting the CPU, RAM, and ROM with one another and transferring data between them; (e) a second bus for passing address data for the data passed through the first bus; (f) a third bus for connecting the CPU with the RAM and transferring data between them, the number of bits of the third bus being larger than that of the first bus; and (g) a fourth bus for connecting the CPU with the RAM and passing address data corresponding to the data passed through the third bus.

The CPU comprises a plurality of data memories serving as general purpose registers; a first multiplexer for selecting one of the data memories and providing an output of the selected data memory to the third bus; a plurality of bank specifying registers for holding positional data of mapping regions in the RAM where the contents of the data memories are mapped; a second multiplexer for selecting one of the bank specifying registers and providing an output of the selected bank specifying register to the fourth bus; and a bank specifying flag for indicating a presently used one of the data memories.

These and other objects, features and advantages of the present invention will be more apparent from the following detailed description of preferred embodiments in conjunction with the accompanying drawings.

DETAILED DESCRIPTION OF THE EMBODIMENTS

The embodiments of the invention will be explained with reference to the drawings.

Figure 3:
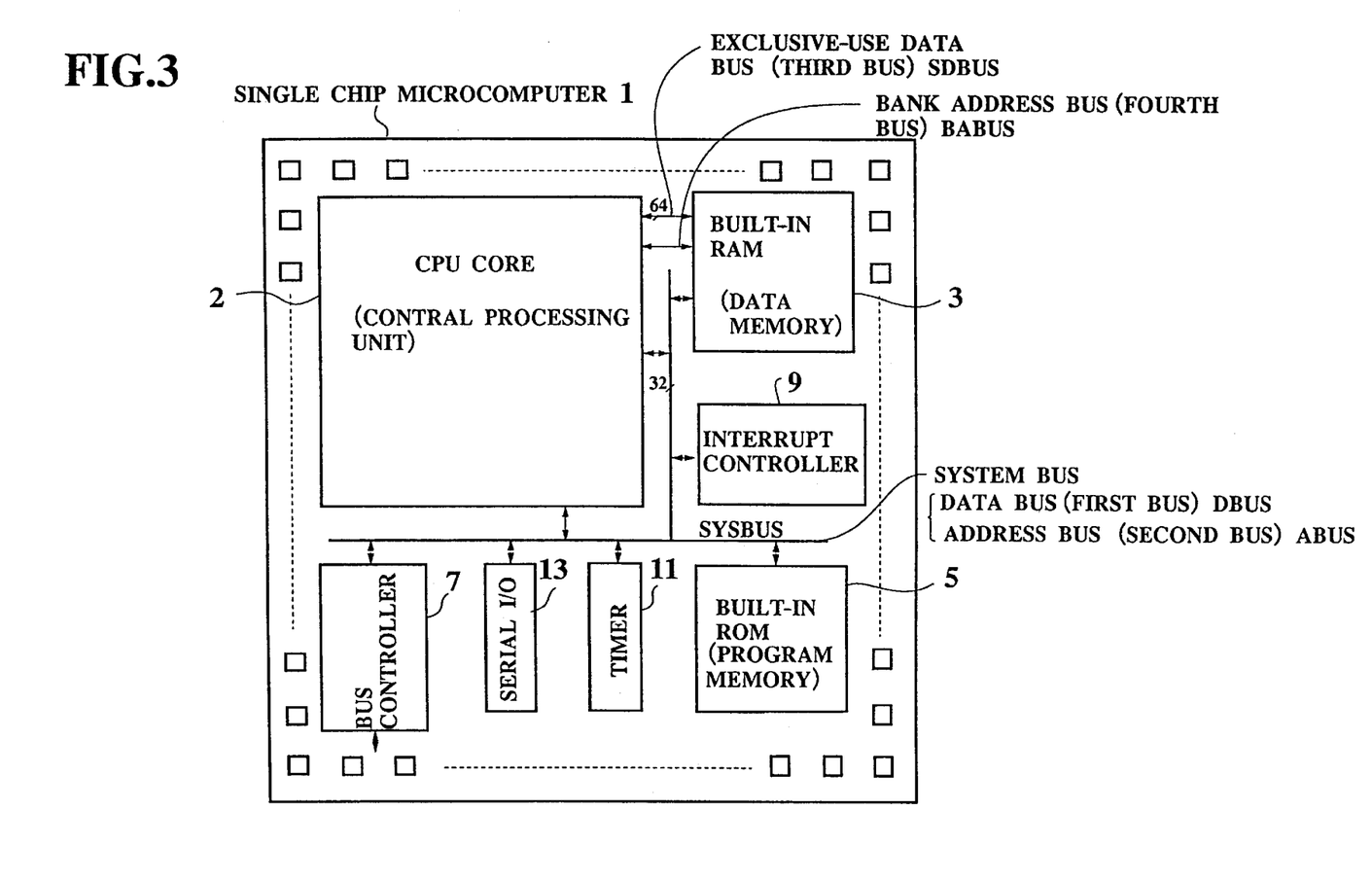
FIG. 3 is a schematic view showing a single chip microcomputer according to a first embodiment of the invention.

FIG. 3 shows a single chip microcomputer according to the first embodiment of the invention.

The single chip microcomputer 1 comprises a CPU (central processing unit) core 2, a on-chip RAM (data memory) 3, a on-chip ROM (program memory) 5, a bus controller 7, an interrupt controller 9, a timer 11, and a serial I/O 13. These elements receive and transmit data through a 32-bit system bus SYSBUS (involving a 16-bit address bus ABUS, and a 16-bit data bus DBUS) disposed in the chip. Data to and from the outside of the chip are passed through a bus controller 7 and an I/O pad.

According to one of the features of the invention, the CPU core 2 is connected with the RAM 3 through exclusive-use buses, which include a 64-bit bidirectional data bus SDBUS and an 8-bit bank address bus BABUS for indicating an address in the RAM 3.

Figure 4:
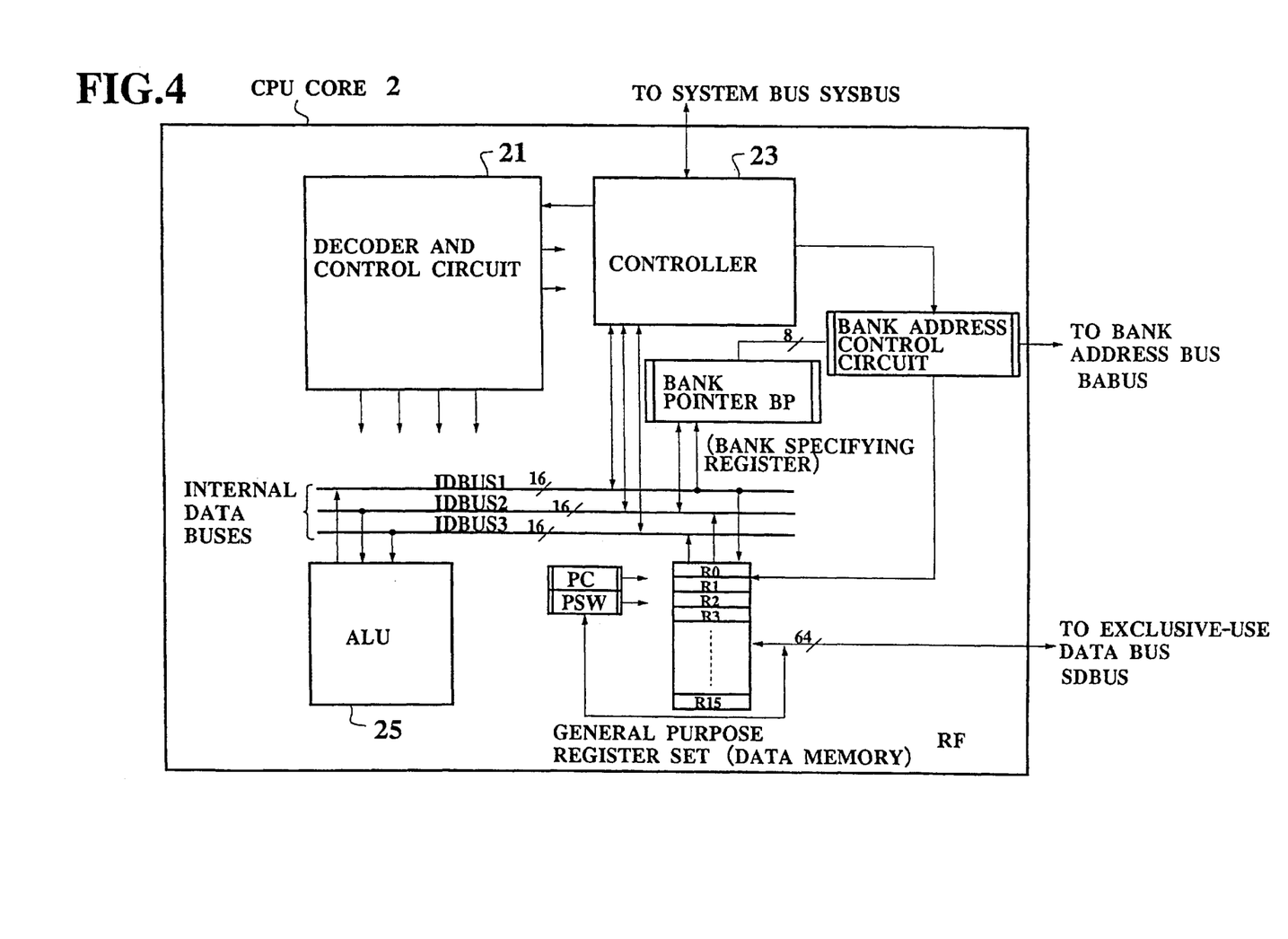
FIG. 4 is a schematic view showing a CPU core of the single chip microcomputer according to the first embodiment of the invention.

FIG. 4 shows the inside of the CPU core 2. The CPU core 2 includes a general purpose register set RF (made of sixteen 16-bit registers), an ALU 25, three 16-bit internal data buses IDBUS1 to IDBUS3, a decoder/control circuit 21, a controller 23, a program counter PC, a processor status word PSW, etc.

The decoder/control circuit 21 decodes instructions and controls the CPU core 2 as a whole.

The controller 23 serves as an interface to the system bus SYSBUS, to read instructions and data necessary for operating the CPU core 2 and provide necessary data to the system bus SYSBUS.

The general purpose register set RF is connected to the three 16-bit internal data buses IDBUS1 to IDBUS3 and to the 64-bit data bus SDBUS.

The program counter PC holds the address of a program which is presently executed. The processor status word PSW defines the internal statuses of the CPU. The program counter PC and processor status word PSW are both connected to the data bus SDBUS.

The CPU core 2 also includes a bank pointer (bank specifying register) BP and a bank address control circuit. the bank pointer BP indicates the bank number of a presently used register bank specified by an instruction from the controller 23. The bank address control circuit controls an address to be provided to the bank address bus according to a value held in the bank specifying register. The bank address control circuit also provides an instruction to read or write the program counter PC, processor status word PSW, and register set RF, as well as an address to read or write the register set RF. These instructions and address data provided by the bank address control circuit and bank pointer BP are passed through the bank address bus BABUS and used to access the RAM 3.

In this way, the CPU core 2 has two data routes, i.e., the system bus SYSBUS and exclusive-use data bus SDBUS. The system bus SYSBUS is used for passing normal addresses and data, the bank address bus BABUS for passing a bank number, and the data bus SDBUS for exclusively passing data saved from or restored to the register set RF, program counter PC, and processor status word PSW.

When the CPU core 2 normally processes data, the register set RF transmits and receives data to and from the ALU 25, etc., through the three 16-bit internal data buses IDBUS1 to IDBUS3.

The 64-bit data bus SDBUS transfers data of four 16-bit registers (16 bits×4=64 bits) of the general purpose register or PC or PSW at a time, and is exclusively used for transferring data between the RF/PC/PSW and the RAM 3 at high speed.

The bank pointer BP is an 8-bit register, which can be designed for up to 256 banks, for holding a value that determines the start address of a mapping region in the on-chip RAM 3. According to the embodiment, the value held by the bank pointer BP is multiplied by 8 (adding "000" to the lower side of the bank pointer BP) to provide the byte address of a start point of a mapping region in the RAM 3. Namely, the start addresses of mapping regions in the RAM 3 are set at 8-bit intervals.

The bank address control circuit produces an address which is used when the CPU transfers data to and from the RAM 3. The bank address control circuit increments a value of the bank pointer, multiplies the value by 8 to provide an address, which is provided as a data transfer address to the bank address bus BABUS.

Figure 5:
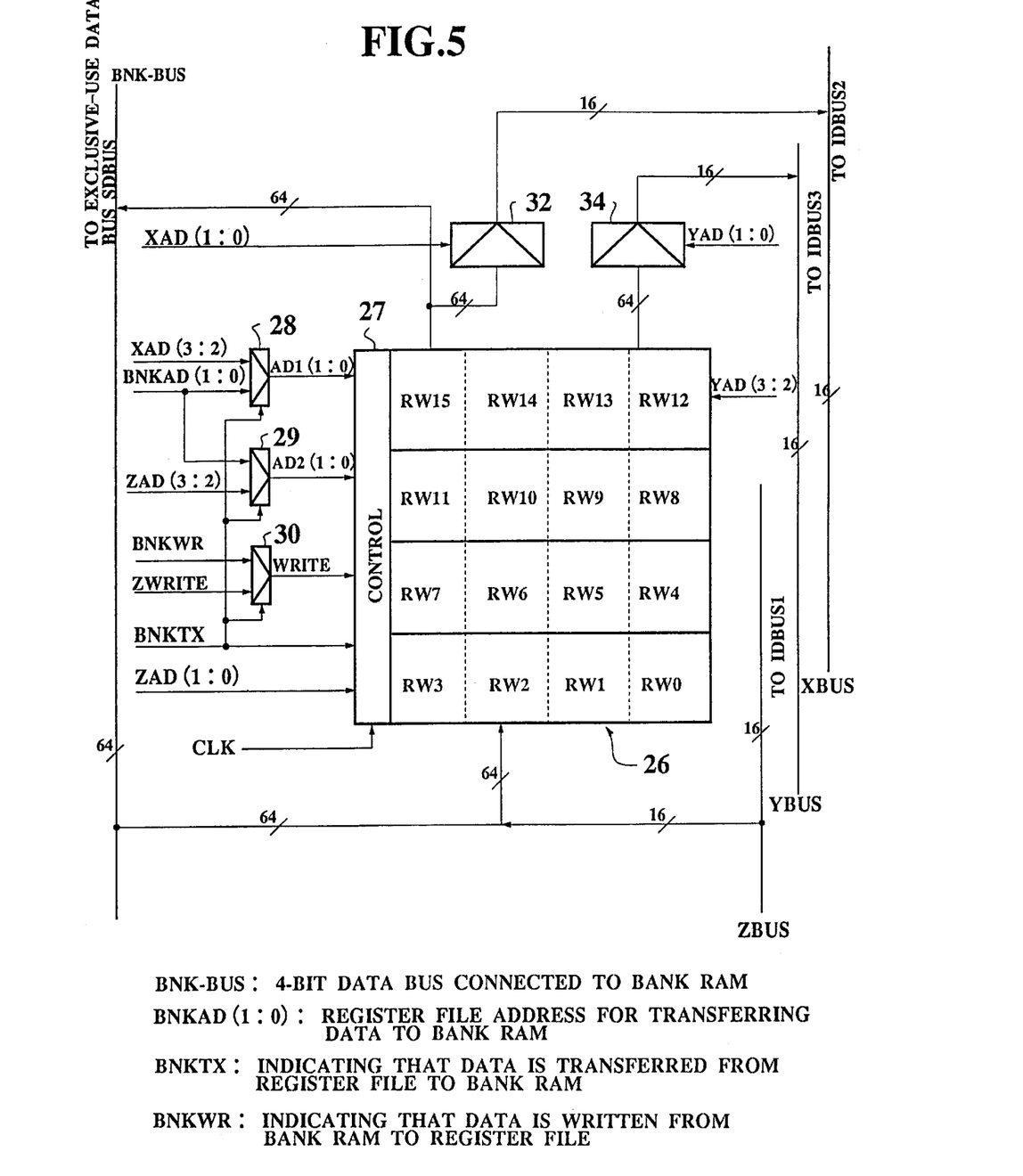
FIG. 5 is a schematic view showing a general purpose register set disposed inside the CPU core of the single chip microcomputer according to the first embodiment of the invention.

FIG. 5 shows the inside of the general purpose register set RF disposed in the CPU core 2.

The register set RF comprises a memory cell block (64 bits×4) 26; a read/write controller 27 for the block 26; a first address selector 28 for selecting an address XAD (3:2) of the register set RF from which data is read for an XBUS, or an address BNKAD (1:0) of the register set RF from which data is sent to the on-chip RAM 3, according to a signal BNKTX indicating that data is transferred to the RAM 3, and providing the selected address to the controller 27; a second address selector 29 for selecting the address BNKAD (1:0) to send data to the RAM 3, or an address ZAD (3:2) of the register set RF from which data is read for a ZBUS, according to the signal BNKTX for transferring data to the RAM 3, and providing the selected address to the controller 27; a third selector 30 for selecting a signal BNKWR indicating that data is written from the RAM 3 to the register set RF, or a signal ZWRITE indicating that data is wriiten from the ZBUS to the register set RF, according to the signal BNKTX indicating that data is transferred to the RAM 3, and providing the selected address to the controller 27; and fourth and fifth selectors 32 and 34 for converting 64-bit data from the block 26 into 16-bit data according to addresses XAD (1:0) and YAD (1:0), and providing the converted data to the XBUS and YBUS, respectively.

A 64-bit BNK-BUS is connected to the exclusive-use data bus (third bus) SDBUS, which transfers data at high speed when data is saved from or restored to the register set RF.

The buses ZBUS, XBUS, and YBUS are connected to the buses IDBUS1, IDBUS2, and IDBUS3 of FIG. 4, respectively. The buses IDBUS1, IDBUS2, and IDBUS3 transfer data under a normal operating state other than saving and restoring data from and to the register set RF.

The signals BNKAD(1:0), BNKWR, BNKTX are generated by the bank address control circuit, and the signals XAD(3:0), YAD(3:0), ZAD(3:0), and ZWRITE are generated by the controller in the CPU.

Figure 6:
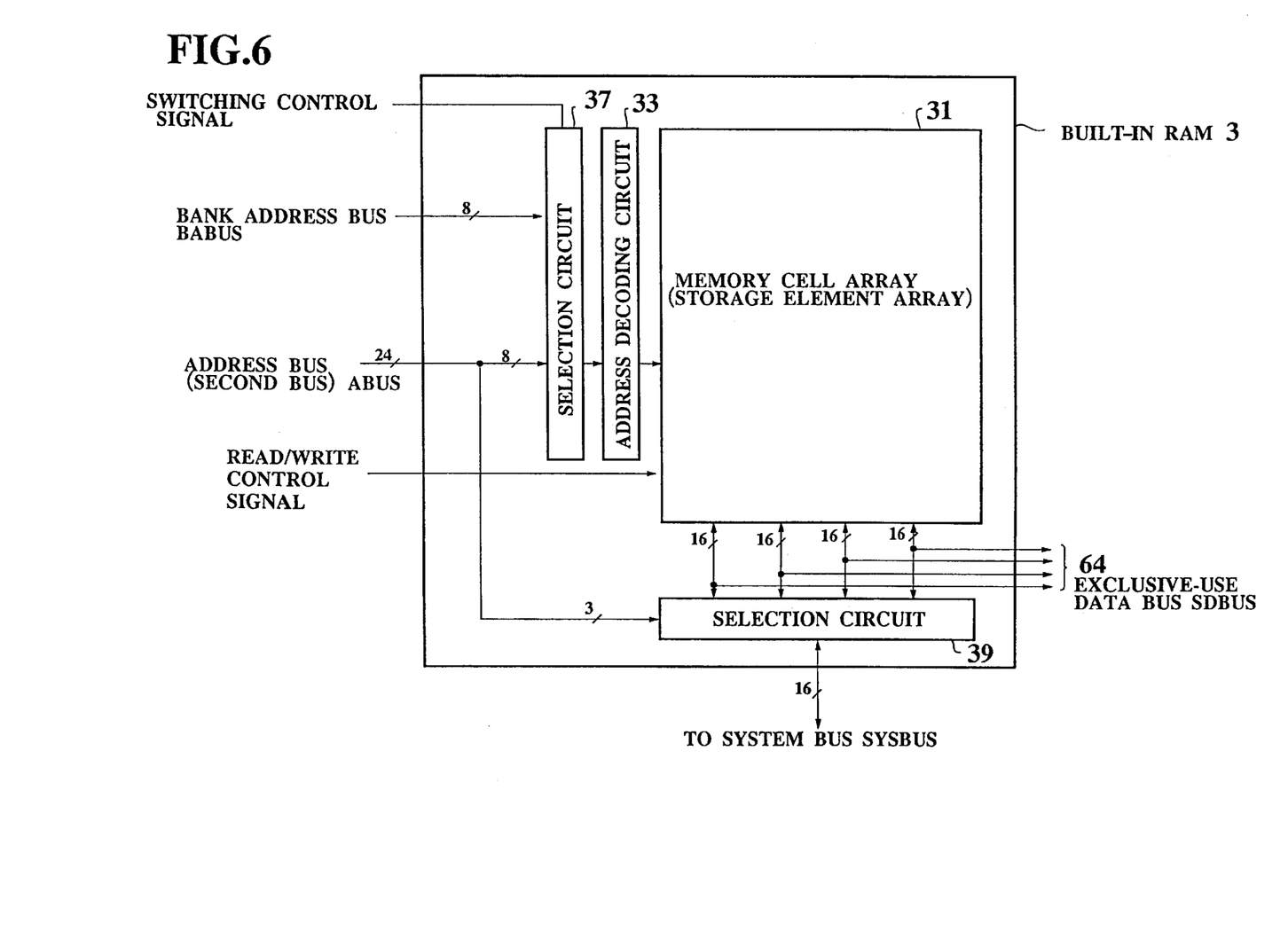
FIG. 6 is a schematic view showing a on-chip RAM of the single chip microcomputer according to the first embodiment of the invention.

FIG. 6 shows the inside of the on-chip RAM 3. The RAM 3 comprises a memory cell array 31 and peripheral elements, which include an address decoder circuit 33 and a peripheral selection circuit 37. The RAM 3 also includes signal lines such as the system bus SYSBUS made of the 16-bit address bus ABUS and the 16-bit data bus DBUS, the 11-bit bank address bus BABUS, the 64-bit data bus SDBUS, and read/write control signal line directly connected to the CPU core 2.

When the on-chip RAM 3 is normally used as a main memory, data in the memory is accessed in a unit of 16 bits at relatively low speed through the system bus SYSBUS according to bus access rules. When the CPU core 2 switches one register bank to another to save or restore data from or to the register set, data is transferred in a unit of 64 bits at high speed through the exclusive-use data bus SDBUS according to an address provided through the bank address bus.

Data of 8 bytes (16 bits×4) stored in the general purpose registers of the register set RF of the CPU core 2 or in the memory cell array 31 of the RAM 3 may be transferred at a time. Since the register set RF is made of 16 bits×16 registers, all data in the register set RF can be completely transferred within four cycles.

A process of switching one register bank to another when an interrupt occurs will be explained.

(1-1) When the interrupt occurs to execute an interrupt processing program during the execution of a program, or when an urgent program is carried out under a multitask environment due to task switching, or when a main program calls a subroutine, the program presently being executed must be suspended to start the different program. In this case, data in the program counter PC (24 bits) and processor status word PSW (32 bits) are passed through the exclusive-use data bus SDBUS and written in the RAM 3 at an address obtained by multiplying a value in the bank pointer BP by 8. The bank address control circuit provides an instruction to read the program counter PC and processor status word PSW through the data bus SDBUS, and multiplies the bank pointer value by 8 to provide the address to the bank address bus.

(1-2) The bank address control circuit adds +1 to the bank pointer value and multiplies the addition result by 8 ((BP+1)×8) to provide an address to the bank address bus. The bank address control circuit then provides an instruction to read data of 64 bits out of the registers R0 through R3 of the general purpose register set, so that the data from the registers R0 through R3 are written in the RAM 3 at the address of (BP+1)×8.

(1-3) The bank address control circuit provides an address of (BP+2)×8 to the bank address bus, so that data of 64 bits of the registers R4 through R7 are written in the RAM 3 through the data bus SDBUS.

(1-4) The same process is carried out for an address of (BP+3)×8 with R8 through R11.

(1-5) The same process is carried out for an address of (BP+4)×8 with R13 through R15.

Figure 10:
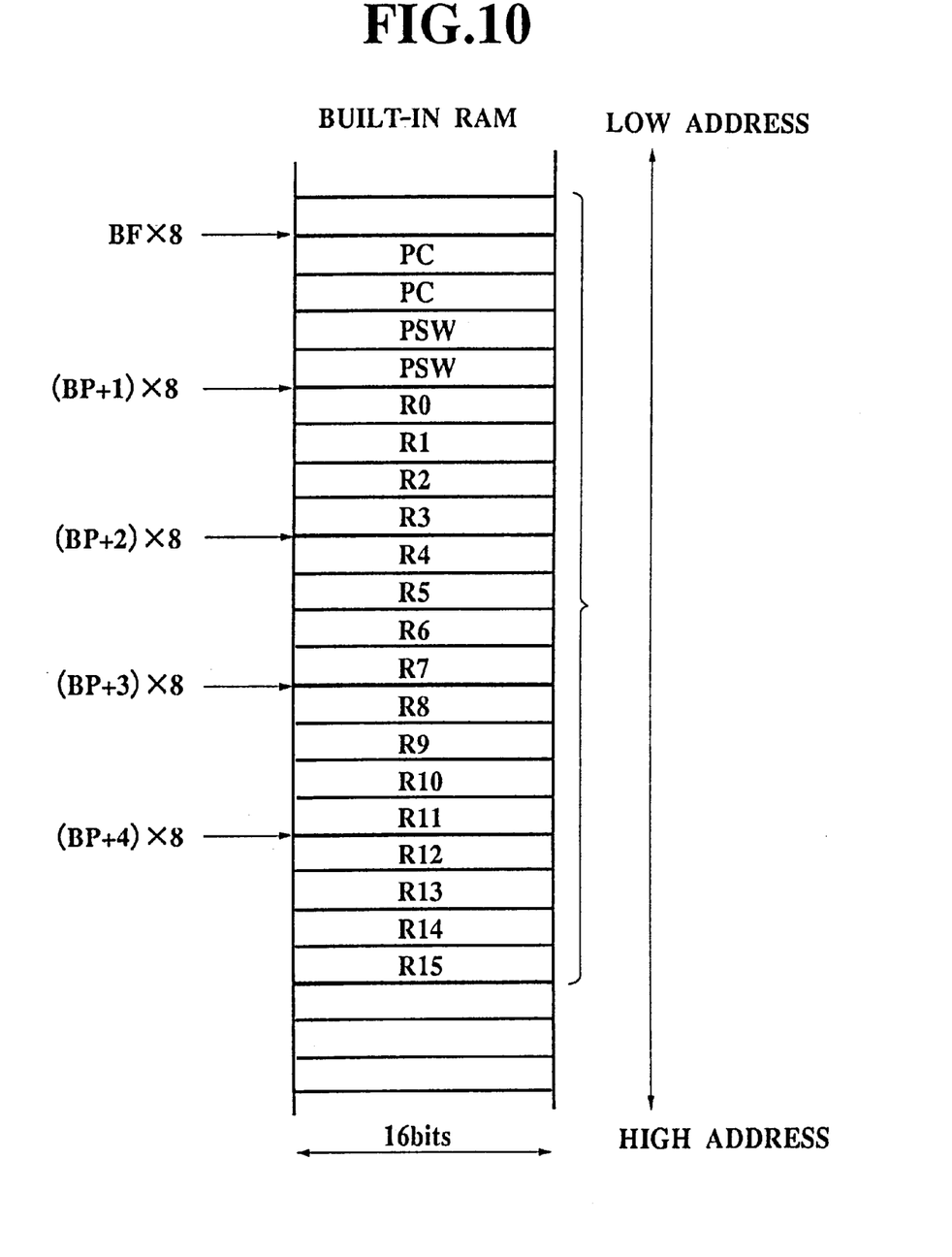
FIG. 10 shows a state of the on-chip RAM after the completion of the saving process.

In this way, the data of the program counter PC, processor status word PSW, and general purpose register set (involving the registers R0 through R15) are saved in the RAM 3. FIG. 10 shows a state of the RAM 3 after the completion of the saving process.

(2) The controller 23 updates the bank pointer BP.

(3) If required, data in a 40-byte memory region in the RAM 3 starting from an address indicated by the updated bank pointer BP, i.e., data necessary for the subroutine program, or for the interrupt processing program, or for the urgent program are transferred to the register set RF, program counter PC, and processor status word PSW of the CPU core 2 through the 64-bit data bus SDBUS.

As will be explained later in detail, part of the data saved in the step (1) is again readable from the memory region of the RAM 3 in the step (3). For example, part of the data for the main routine program data related to the subroutine can be collectively read from the RAM 3. Namely, the same data are sharable by different register banks. This may improve data processing efficiency.

(4) After the subroutine program, or the interrupt processing program, or the urgent program is completed, a restoration instruction is issued. The controller 23 changes the bank pointer BP to indicate a value corresponding to the start address of the region where the data have been saved in the step (1). According to the changed value of the bank pointer BP, the bank address control circuit generates a bank address, and sends it to the on-chip RAM 3 through the bank address bus BABUS. After that, the data saved in the step (1) are restored in the program counter PC, processor status word PSW, and general purpose register set RF of the CPU core 2 through the exclusive-use 64-bit data bus SDBUS. Thereafter, the suspended program is resumed.

The data sharing will be explained in detail.

Data can be shared by a plurality of register banks if mapping regions of the register banks in the on-chip RAM 3 overlap one upon another. This may be achieved by setting proper values in the bank pointer BP one after another.

According to the embodiment, a value in the bank pointer BP is converted into a byte address that is a multiple of 8. The program counter PC (24 bits), processor status word PSW (32 bits), and general purpose register set RF involving 16 bits×16 registers occupy a 40-byte region in the RAM 3. If the step (1) sets "n" in the bank pointer BP, a write start address in the RAM 3 will be 8n, so that the contents of the register set RF, program counter PC, and processor status word PSW will be written in the region starting from addresses 8n to 8n+39 in the RAM 3. The step (2) may set "m" in the bank pointer BP, and the step (3) reads data from the region having addresses 8m to 8m+39 in the RAM 3 and restores them in the RF, PC, and PSW.

In this way, the values n and m to be set in the bank pointer may be properly selected so that data mapping regions for different register banks in the RAM 3 may partly overlap one upon another to enable data to be partly shared by the different register banks. According to the invention, if 8n<=8m<=8n+39 or 8m<=8n<=8m+39, data can be shared by different register banks.

Figure 7:
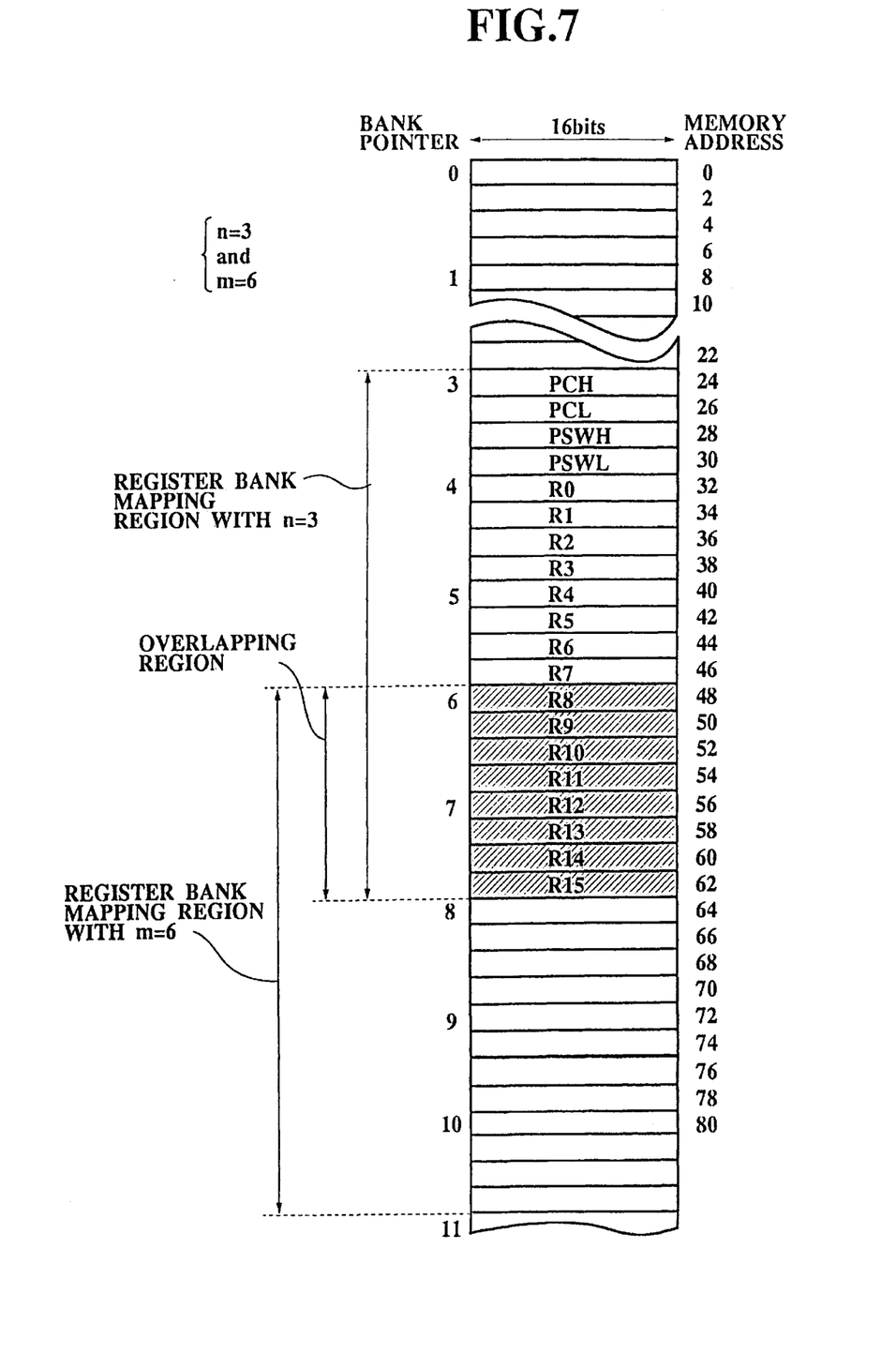
FIG. 7 is a memory map of the on-chip RAM of the single chip microcomputer of the invention, with mapping regions for the register set overlapping between different register banks (n=3 and m=4)

FIG. 7 shows overlapped mapping regions in the RAM 3 for storing data of different register banks with n=3 and m=6.

Figure 8:
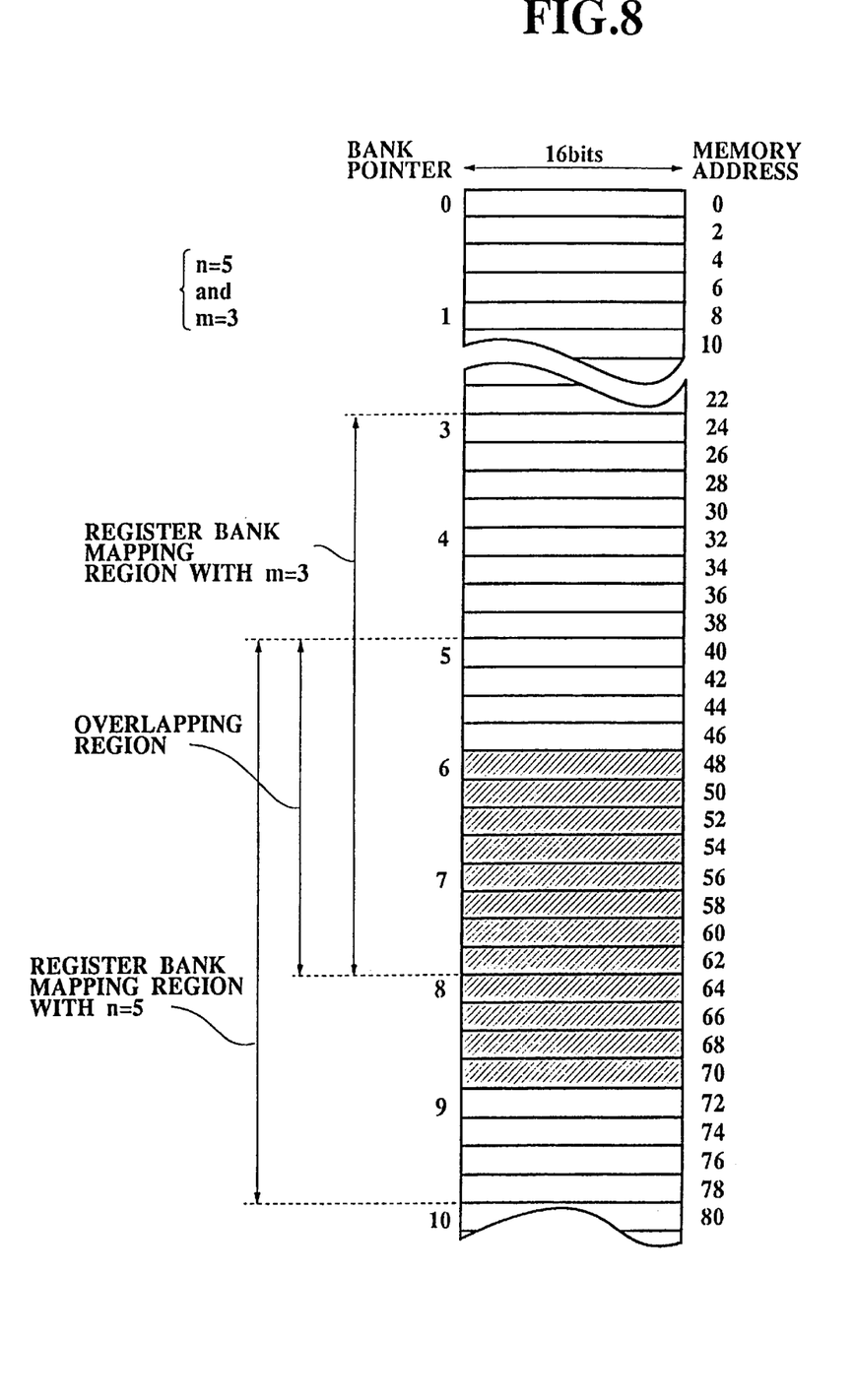
FIG. 8 is a memory map of the on-chip RAM of the single chip microcomputer of the invention, with mapping regions for the register set overlapping between different register banks (n=6 and m=4)

FIG. 8 shows overlapped mapping regions in the RAM 3 for storing data of different register banks with n=5 and m=3.

In this way, the register bank arrangement according to the embodiment easily enables data to be shared by or passed over between different register banks before and after a register bank switching operation. This improves data processing efficiency.

Figure 9:
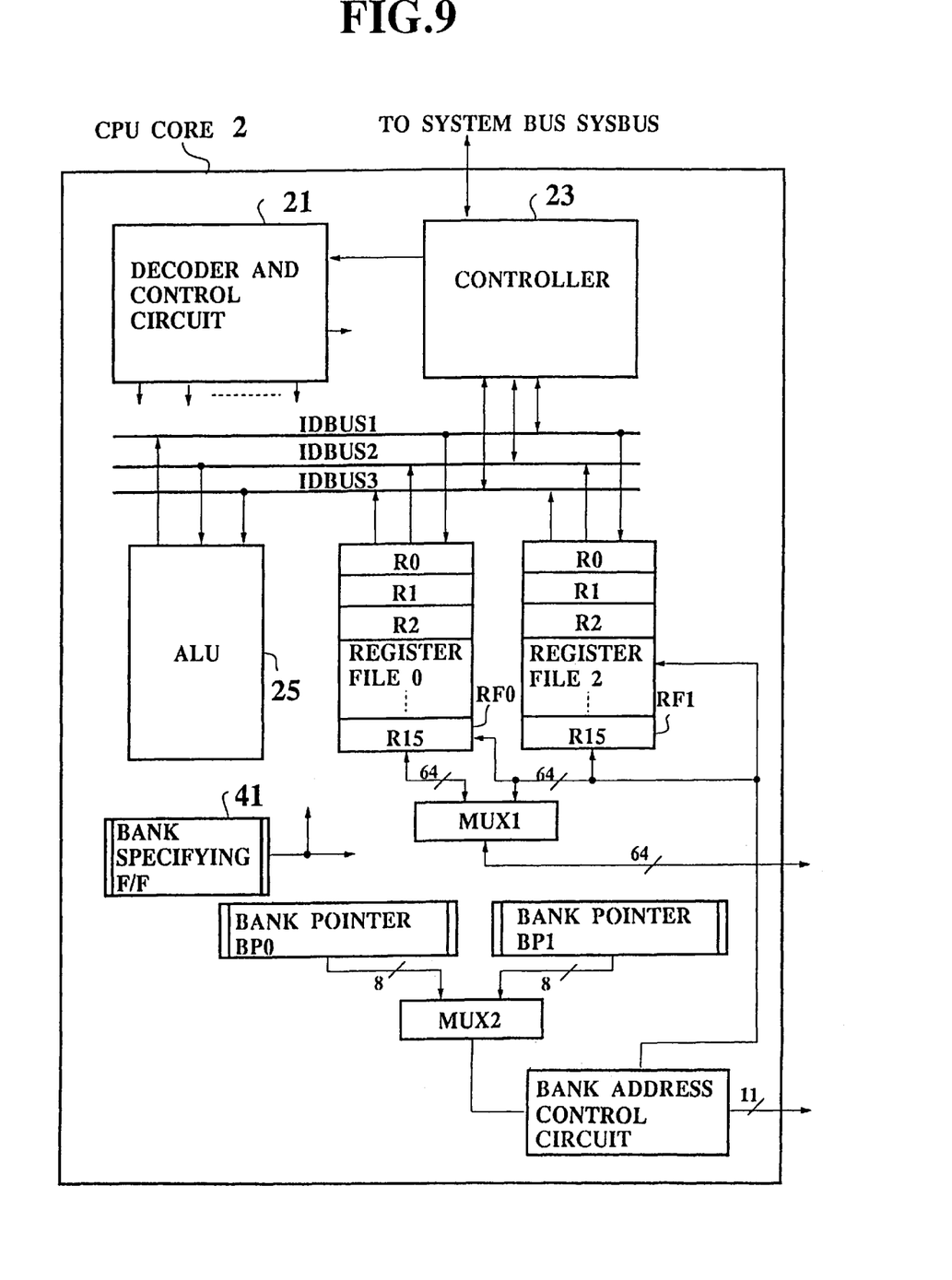
FIG. 9 is a schematic view showing a CPU core of a single chip microcomputer according to a second embodiment of the invention.

FIG. 9 shows the inside of a CPU core 2 according to a second embodiment of the invention. In this embodiment, the CPU core 2 incorporates two general purpose register sets RF0 and RF1. Other arrangements of this embodiment are the same as those of the first embodiment.

The CPU core 2 comprises the two register sets RF0 and RF1 each having sixteen 16-bit registers; an ALU 25; three 16-bit internal data buses IDBUS1 through IDBUS3; a bank pointer BP0 for indicating the register bank number of the register set RF0; a bank pointer BP1 for indicating the register bank number of the register set RF1; and a 1-bit bank specifying F/F 41 for specifying a valid one of the register sets RF0 and RF1. When the F/F 41 is "1," the register set RF1 is valid, and when it is "0," the register set RF0 is valid.

The two register sets RF0 and RF1 are connected to the three 16-bit internal data buses IDBUS1 to IDBUS3, and selectively connected to the 64-bit exclusive-use data bus SDBUS through a multiplexer MUX1. Outputs of the two bank pointers BP0 and BP1 are selectively provided to a bank address control circuit. The bank address control circuit adds +1 to a value held in a bank address pointer and multiplies the addition result by 8 to provide an address. Also, the bank address control circuit controls to write and read data to and from the register sets, a program counter PC, and a processor status word PSW through the SDBUS. The multiplexers MUX1 and MUX2 carry out the selection according to the contents of the bank specifying F/F 41.

When the CPU core 2 is normally executing a program, one general purpose register set RFi specified by the bank specifying F/F 41 is used, and data are processed between the register set RFi and the ALU 25 through the 16-bit internal data buses IDBUS1 to IDBUS3.

When one register bank is switched to another, data in the register set RFi are saved and restored as follows:

(1) When an interrupt occurs or an interrupt aprocessing program is executed during the execution of a program, or when an urgent program is carried out under a multitask environment due to task switching, or when a main program calls a subroutine program, the program presently being executed must be suspended to start the different program. In this case, a controller 23 changes a value in the bank specifying F/F 41, to disable the register set RF0 which is presently used.

(2) If required, data in the on-chip RAM 3 starting from an address indicated by the bank pointer BP1 is updated, i.e., data necessary for the subroutine program, or for the interrupt processing program, or for the urgent program are transferred to the register set RF1 specified by the bank specifying F/F 41 through the 64-bit exclusive-use data bus SDBUS.

(3) Data in the disabled register set RF0 are saved in a region of the RAM3 starting from an address specified by the corresponding bank pointer BP0, through the 64-bit data bus SDBUS.

(4) After the subroutine program, or the interrupt processing program, or the urgent program is completed, a restoration instruction is issued. The controller 23 changes the bank pointer BPi to indicate a value corresponding to the start address of the region where the data have been saved in the step (3). The changed value in the bank pointer BPi is sent to the on-chip RAM 3 through the bank address bus BABUS, and the data saved in the step (3) are restored in the register set RFi of the CPU core 2 through the exclusive-use 64-bit data bus SDBUS. Thereafter, the suspended program is resumed.

The step (3) is not necessarily carried out just after the register banks are switched from one to another. It may be carried out at a proper timing after the different program is started and the banks are switched from one to another. This is because the contents of the disabled register set RF0 are held until the next register bank switching is carried out. Namely, a bank switching time will be a sum of processing time of the step (1) and that of the step (2).

Compared with the first embodiment, the second embodiment is speedier because the saving of the register set RF0 in the step (3) is not included, in appearance, in the bank switching time.

In summary, the invention realizes the register bank function in a single chip microcomputer by mapping data between a on-chip RAM and a data memory (register set) of the microcomputer. To physically transfer data for the mapping at high speed, the invention employs a wide bandwidth third bus (the exclusive-use data bus SDBUS) between the RAM and the data memory. As a result, a CPU core according to the invention may have at least one multiport data memory because simultaneous read and write operations don't occur. Namely, it is not necessary to implement a large-scale multiport memory for register banks. The invention thus realizes a compact single chip microcomputer which is easy to design and operates at high speed.

Namely, data are written to and read from the on-chip RAM through the system buses (A(23:0), D(15:0)) and through the exclusive-use bank buses (SDBUS, BABUS). To prevent a simultaneous access of the on-chip RAM through the system buses and exclusive-use bank buses, memory cells of the on-chip RAM have a single port.

Through the wide bandwidth third bus of the invention, the contents of the data memory are saved and restored at high speed when the register banks are switched from one to another. Due to the third bus, a system bus (first bus) of the microcomputer will be free during the switching, so that the first bus may be used for other purposes such as transferring instructions from an on-chip ROM to a central processing unit, or first and second bus rights may be given to another bus master in the system to let that bus master use the buses. As a result, the single chip microcomputer may form a high performance system.

Namely, a conventional system bus is connected to various elements such as an on-chip ROM, a serial I/O, and controllers in a chip, so that it must bear large load capacity and wiring capacity. This is the reason why the conventional system bus has a slow data transmission speed to hinder a high-speed operation.

To solve this problem, the present invention employs an exclusive-use bus extending between, for example, a CPU core and an on-chip RAM. Since the load capacity and wiring capacity of this exclusive-use bus are smaller than those of the conventional system bus, the exclusive-use bus is suitable for a high-speed operation.

In designing a single chip microcomputer, particularly in laying out blocks of the single chip microcomputer, the CPU core and on-chip RAM may be arranged close to each other to minimize the length of the exclusive-use bus disposed between them, to thereby reduce the wiring capacity of the exclusive-use bus.

The invention sets a proper value in a bank specifying register so that different register banks may be partly overlapped one upon another when they are mapped in the on-chip RAM. This enables the different register banks to partly share data, or data may be handed over from one register bank to another when the banks are switched from one to another. As a result, the single chip microcomputer according to the invention may easily transfer parameters, for example, from a main routine program to a subroutine program.

Although the entities of data of the register banks are in the on-chip RAM, this RAM is usable as a standard main memory, so that the memory can be effectively used even when the register bank function is not needed.

The invention is applicable for cell base LSIs of semi-custom LSIs. In this case, a CPU core having a bank address control circuit, a bank pointer, etc., is prepared as a cell and combined with a on-chip RAM cell having a required capacity. This technique simplifies LSI designing and reduces a development period and cost.

Various modifications will become possible for those skilled in the art after receiving the teachings of the present disclosure without departing from the scope thereof.

What is claimed is:

1. A single chip microcomputer comprising:
   (a) a central processing unit (CPU) for processing programs;
   (b) an on-chip RAM;
   (c) an on-chip ROM;
   (d) a first bus for connecting said CPU, RAM and ROM with one another and passing data between them;
   (e) a second bus for passing address data corresponding to the data passed through said first bus;
   (f) a third bus for connecting said CPU with said RAM and dedicated to passing data between said CPU and said RAM, a number of bits of said third bus being larger than that of said first bus; and
   (g) a fourth bus for connecting said CPU with said RAM and passing address data corresponding to said data passed through said third bus,
   (h) said CPU suspending, upon receiving a request of executing a different program, a presently executing program, transferring address data to said RAM through said fourth bus, saving data held in said CPU into said RAM through said third bus according to the address data transferred on said fourth bus, starting and completing the different program, transferring the address data of the saved data to said RAM through said fourth bus, restoring the saved data from said RAM into said CPU through said third bus, and resuming the suspended program;
   (i) said third and fourth buses being exclusively used for switching between the presently executing program and the different program;
   (j) said third and fourth buses each having respective load capacities and wiring capacities smaller than said first and second buses;
   (k) said CPU including a general purpose register set, an arithmetic logic unit (ALU), and an internal data bus which connects said general purpose register set and said ALU;

(l) said ALU connected to said first bus via said internal data bus; and (m) said third bus being directly connected to said general purpose register set.

2. The single chip microcomputer according to claim 1, wherein said CPU has:

a data memory serving as one or more general purpose registers for receiving and providing data through said third bus when the data are saved and restored to and from said RAM;

a bank specifying register for holding address data and providing said address data through said fourth bus, said address data being used to save and restore data to and from said RAM through said third bus; and control means for controlling said data memory and said bank specifying register.

3. The single chip microcomputer according to claim 2, wherein said control means of said CPU uses said data memory as register banks and determines mapping regions for each of a plurality of the register banks in said RAM, said bank specifying register receiving at one time address data corresponding to one of said register banks and receiving at another time address data corresponding to another of said register banks so that a mapping region in said RAM corresponding to said one register bank and a mapping region in said RAM corresponding to said another register bank may overlap with one another.

4. The single chip microcomputer according to claim 2, wherein said CPU has a control data register for holding control data related to a presently executing program, said control data register being connected to said third bus, and the contents of said control data register being saved and restored to and from said RAM through said third bus.

5. The single chip microcomputer according to claim 1, wherein said CPU has:

a data memory serving as general purpose registers for providing internal data to said third bus; and a bank specifying register for holding positional data of mapping regions in said RAM where the contents of the data memory are mapped.

6. The single chip microcomputer according to claim 2, wherein said bank specifying register holds address data corresponding to a start address of a mapping region in said RAM for one of said one or more general purpose registers.

7. A single chip microcomputer comprising:

(a) a central processing unit (CPU) for processing programs, said CPU comprising a Processor Status Word Register, a Program Counter Register, and a General Purpose Register Set;

(b) an on-chip RAM;

(c) an on-chip ROM;

(d) a first bus for connecting said CPU, RAM and ROM with one another and passing data between them;

(e) a second bus for passing address data corresponding to the data passed through said first bus; (f) a third bus for connecting said CPU with said RAM, said third bus being used only for passing data respectively held in said Program Counter Register, said Processor Status Word Register, and said General Purpose Register Set between said CPU and said RAM, a number of bits of said third bus being larger than that of said first bus; and (g) a fourth bus for connecting said CPU with said RAM and passing address data corresponding to said data passed through said third bus.

8. The single chip microcomputer according to claim 5, wherein said CPU has:

a plurality of data memories serving as general purpose registers;

a first multiplexer for selecting one of the data memories and providing an output of the selected data memory to said third bus;

a plurality of bank specifying registers for holding positional data of mapping regions in said RAM where the contents of the data memories are mapped;

a second multiplexer for selecting one of the bank specifying registers and providing an output of the selected bank specifying register to said fourth bus; and a bank specifying flag for indicating a presently used one of the data memories.

9. The single chip microcomputer according to claim 5, wherein said RAM has a memory cell array and an address selection circuit, which is connected to said second and fourth buses to selectively provide an address to the memory cell array.

10. The single chip microcomputer according to claim 5, wherein said CPU has a register for holding control data related to a presently executing program, this register being connected to said third bus, and the contents of this register being saved and restored to and from said RAM through said third bus.

11. The single chip microcomputer according to claim 1, wherein said CPU comprises a Processor Status Word Register, a Program Counter Register, and a General Purpose Register Set, and wherein said third bus is only used for transferring data respectively held in said Program Status Word Register, said Program Counter Register, and said General Purpose Register Set corresponding to the presently executing program between said CPU and said RAM when switching between the presently executing program and the different program.

12. A method of selecting one of a plurality of register banks, a corresponding program counter value, and a corresponding processor status word in a single chip microcomputer having an on-chip RAM and an execution unit, comprising the steps of:

a) executing a first program using said execution unit of said microcomputer, wherein said execution of said first program uses a processor status word, a program counter value and a register bank corresponding to said first program;

b) receiving a request to perform a second program while said first program is executing;

c) saving said processor status word, said program counter value and data stored in said register bank corresponding to said first program in a designated location in said RAM via a dedicated data bus and a dedicated address bus connecting said executing unit of said microcomputer and said RAM;

d) retrieving a processor status word, a program counter value and data to be stored in a register bank corresponding to said second program from another location in said RAM via said dedicated data bus and said dedicated address bus;

e) executing at least a portion of said second program;

f) after said execution of said portion of said second program is complete, retrieving said processor status word, said program counter value, and said data stored in the saving step c) from said designated location in said RAM via said dedicated data bus and said dedicated address bus;

g) executing said first program at an instruction corresponding to said program counter value retrieved in the step f).

* * * * *